United States Patent
Drye

[15] 3,681,629
[45] Aug. 1, 1972

[54] ELECTRICAL RECTILINEAR-MOTION DEVICES

[72] Inventor: Lucien Drye, Colombes, France
[73] Assignee: Jeumont-Schneider, Paris, France
[22] Filed: April 26, 1971
[21] Appl. No.: 137,198

[30] Foreign Application Priority Data

April 28, 1970 France..........................7015408

[52] U.S. Cl......................................310/14, 310/30
[51] Int. Cl..............................................H02k 41/02
[58] Field of Search..........................310/12–14, 15, 310/16, 17, 19, 24, 34, 35, 30; 318/124, 125, 119; 417/; 290/1

[56] References Cited

UNITED STATES PATENTS 2,721,453  10/1955  Reutter.....................310/16 UX
2,900,592  8/1959  Baruch.......................310/17 X
3,538,357  11/1970  Barthalon...................310/17 X Primary Examiner—D. F. Duggan
Attorney—Raymond A. Robic

[57] ABSTRACT

A rectilinear-motion device comprising an armature shaft acted on lengthwise by a moving magnetic field produced by a field device disposed around the armature shaft. A tubular member is rigidly secured to the field device and disposed on the axis thereof beyond at least one of its end faces, and means are associated with the armature shaft and with the tubular member to bound therein two liquid-filled hermetic enclosures through which the shaft extends and which are interconnected by a limited-delivery duct so that the volumes of the enclosures vary in inverse proportion and by the same amount for a movement of the shaft in either direction.

5 Claims, 4 Drawing Figures

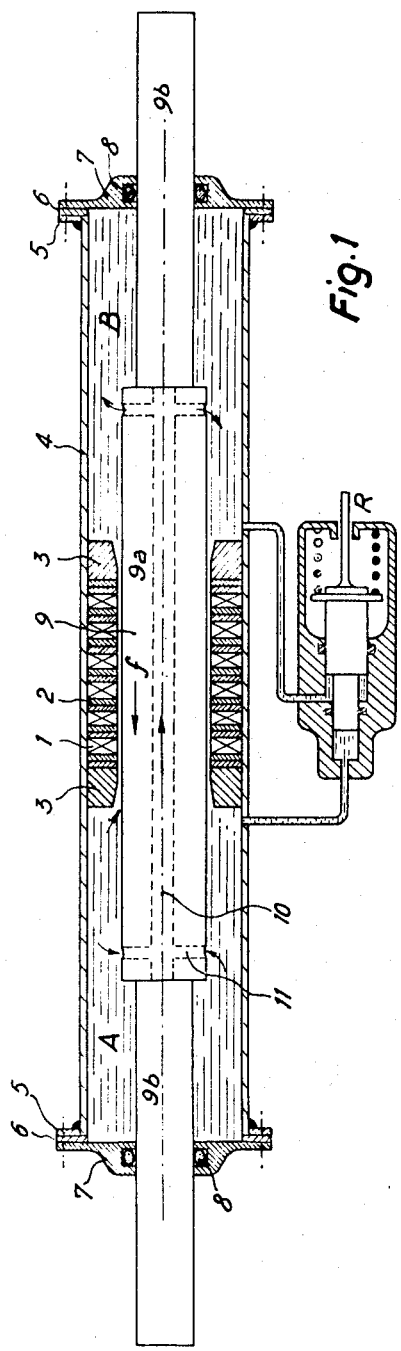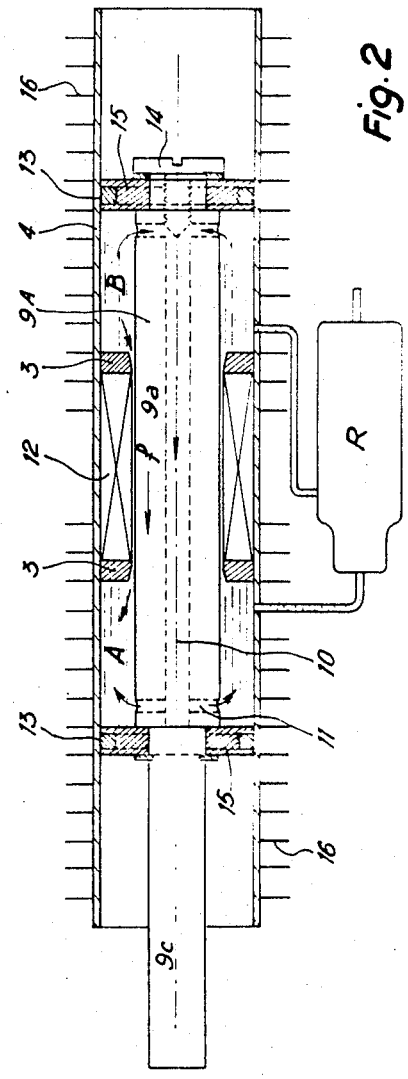

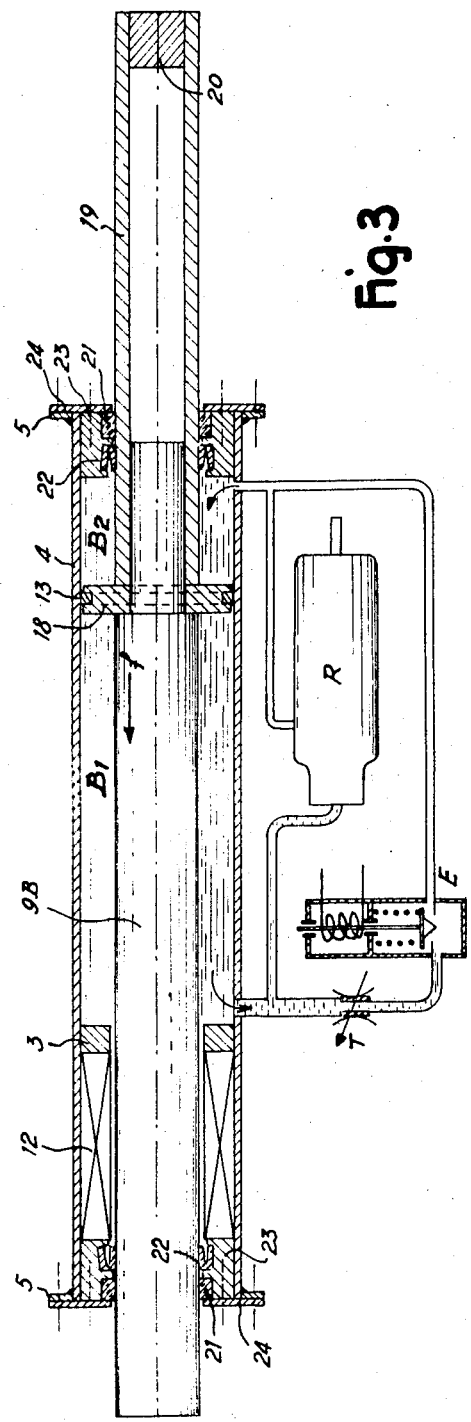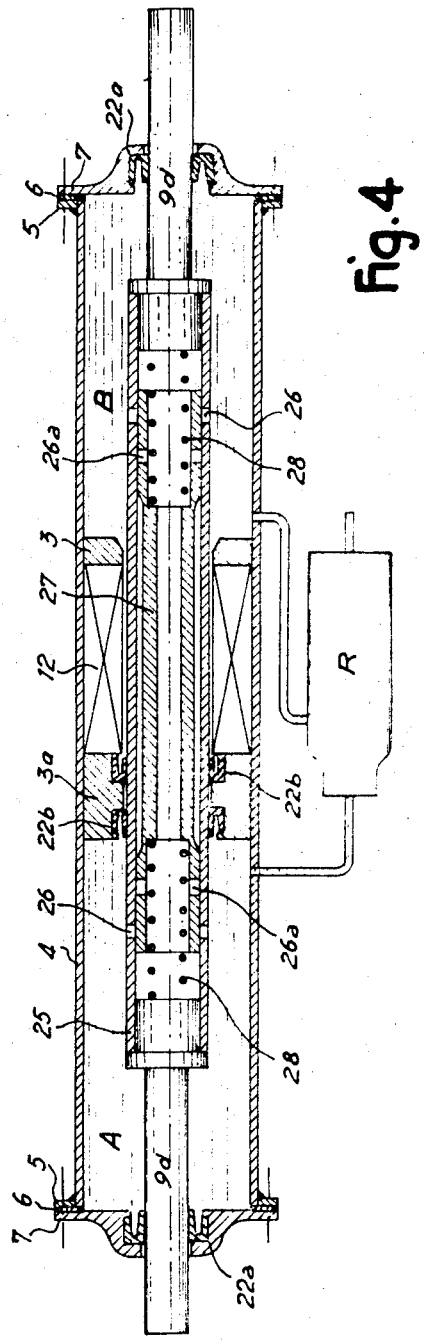
INVENTOR
Lucien DRYE

ELECTRICAL RECTILINEAR-MOTION DEVICES

This invention relates to induction type electrical devices which have a generally tubular or similar shape and in which a moving drive part is adapted to move linearly.

Devices of this kind of course operate on the electrotechnical principle of rotating-field induction motors and comprise a field and an armature associated to slide one in another. The armature usually takes the form of a magnetic cylindrical shaft which sometimes has a conductive jacket, in which event the field is formed with a circular central aperture in which the shaft is engaged and retained coaxially to leave an air gap bounded peripherally by the armature outside surface and the inside surface of the aperture in the field. The field mainly comprises a magnetic circuit and winding, the latter being received in circular grooves in the magnetic circuit near the field inside surface. Consequently, when the windings are connected in some appropriate way to a polyphase a.c. supply, a magnetic field which is substantially sinusoidal longitudinally travels along the air gap and induces currents in the armature with the result that an axial force is developed between the armature and the field in a direction depending upon the direction of movement of the moving electromagnetic field, i.e., depending upon the sequence direction of the phases of the voltages applied to the various windings. The axial force is evenly distributed around the shaft and remains constant during the linear movement of the shaft through the field device.

This device is not widely used because, in its form as just outlined, it has two disadvantages for many uses:

If the driving force at starting is considerably higher than the resistive force, which is a reasonable practical condition, the linear speed of the shaft will increase too rapidly; and If the shaft is operated frequently, it will tend to heat up since its speed is low as compared with the speed of the moving electromagnetic field.

To obviate these two disadvantages it is an object of the invention to provide a drive facility having a specially dimensioned shaft moving in at least one liquid-filled enclosure which serves two purposes which are of reducing shaft speed and removing the heat which the shaft absorbs as it moves in the field device.

The rectilinear-motion drive means, according to the invention, therefore comprise: a magnetic shaft acted on lengthwise by the moving magnetic field produced by a field device disposed around the shaft; a tubular member rigidly secured to the field device and disposed on the axis thereof beyond at least one of its end faces; and means associated with the shaft and with the tubular member to bound therein two liquid-filled hermetic enclosures through which the shaft extends and which are interconnected by a limited-delivery duct so that the volumes of the enclosures vary in inverse proportion and by the same amount for a movement of the shaft in either direction.

For a fuller description of the constructional and operational features of the improvement according to the invention, some embodiments will now be described with reference to the accompanying drawings, all in longitudinal section, in which:

FIG. 1 shows a device in which enclosures are disposed at both ends of the field and in which there are two shaft ends;

FIG. 2 shows a device in which there are enclosures disposed at both ends of the field device and in which there is only one shaft end;

FIG. 3 shows a device in which there are enclosures disposed at the same end of the field device, and FIG. 4 shows a device with a hydraulic locking facility.

The drive device shown in FIG. 1 comprises a stationary field part comprising windings 1 interposed between sheet-metal discs 2 having substantially the same outer and inner diameters as the coils or windings 1. This assembly is clamped between plates or cheeks 3 and so mounted in the central part of a tubular member 4 made of a magnetic metal as to allow the magnetic field produced by the windings 1 to travel lengthwise between the discs 2. Welded to the ends of member 4, are flanges 5 on which end plates 7 are centered with the interposition of gaskets 6. The members 7 are formed with a central aperture in which a shaft 9 can slide with the interposition of ring gaskets 8. The shaft 9 comprises a central portion 9a, one part of which always experiences the radial field produced by the discs 2, and two side parts 9b of smaller diameter than the central part 9a. The shaft 9 is of known construction and is in at least two parts so that before it is assembled an axial passage 10 can be drilled in the central part 9a, the passage 10 communicating via radial passages 11 with enclosures A, B filled with an insulating liquid such as oil. Consequently, when shaft 9 moves for any reason in the direction indicated by an arrow $f$, the volume of enclosure A decreases and the volume of enclosure B increases by the same amount, so that liquid flows from A to B through the central shaft passage 10 and, to some extent, along the air gap. The shaft part extending from the field device is therefore satisfactorily cooled centrally and peripherally and the oil circuit pressure losses caused by shaft movement limit shaft speed. Before the shaft shoulders abut the end plates 7, the shaft 9 is braked by a progressive reduction in the rate of fluid flow when the passages 11 are opposite the members 3.

To compensate for volumetric expansions of the liquid and thus enable the device to operate satisfactorily over a wide range or temperatures, a compensator R of known type is connected to a line interconnecting the enclosures A and B. A compensator of this type, which is shown in FIG. 1 and in the other drawings to a smaller scale than the main device, comprises two pistons which are of equal surface area and which experience a thrust, balanced by a spring, equal to the algebraic sum of the forces caused by the pressures in the enclosures A and B. The device R is therefore unaffected by any pressure difference arising from a force applied to shaft 9, since any pressure increase in any one enclosure is accompanied by an equivalent pressure decrease in the other enclosure. However, any change in volume caused by heating causes the compensator pistons to move.

For uses where the driven element can be operated by a single shaft end, a small-size device can be embodied in accordance with the embodiment shown in FIG. 2, which has a field device 12. The enclosures A, B are in this case bounded by pistons 15 which are secured to the ends of the driving part 9a of the shaft 9A and which slide in the tubular member 4, sealing-tightness being ensured by gaskets 13. The shaft portion 9a is extended at one end by a shaft end 9c; at the other end of shaft part 9a the central passage 10 is closed by a plug 14. In the embodiment shown the shaft 9A is centered and guided by means of the pistons 15. Also, the tubular member 4 has cooling fins 16 which ceteris paribus are a means of improving heat removal. When therefore shaft 9A moves laterally in the direction indicated by the arrow f, the liquid in enclosure B flows to enclosure A through the central passage 10 and the radial passages 11, the advantages being the same as in FIG. 1.

The device shown in FIG. 3 can be used with advantage for rectilinear-motion drive devices which operate like some lifting appliances, with an electrodynamic driving effect in only one direction. In this embodiment a field device 12 is disposed at one end of the tubular member 4 against one of the bearings, and the other bearing cooperates with that part of the tubular member which is not occupied by the field device 12 to bound an enclosure divided into two chambers $B_1$ and $B_2$ by a piston 18 mounted on a shaft 9B between a shoulder of shaft 9B and a tube 19 of the same outer diameter as the shaft 9B. The end of tube 19 is, if necessary, closed by a plug 20. Shaft 9B and tube 19 are centered and guided by means of bearings 21 which, together with gaskets 22, are borne by rings 23 secured to plates 24.

The two chambers $B_1$, $B_2$ communicate with one another by way of a constriction device T and a solenoid valve E whose winding is energized simultaneously with the field device The constriction device T is of known kind and serves to adjust the rate of fluid flow between the chambers and therefore to adjust shaft speed for a given resulting force. The valve E interrupts all hydraulic communication upon cessation of field energization, with the result that shaft 9B is retained in the position in which it stopped when the current was interrupted.

At the end of its travel the piston 18 abuts the rings 3 or 23 at a very reduced speed, the outer pipes being connected to the chambers so as to be virtually completely closed by the piston 18 before the same abuts the end rings.

When the device shown in FIG. 3 operates with electrodynamic attraction in one direction only, the return being either by free fall or by a spring, it is advantageous for the device to be positioned so that the shaft 9B makes its operative stroke to the right to ensure thorough cooling of the shaft part emerging from the then energized field device.

The shaft of the embodiment shown in FIGS. 1 and 2 can also be locked hydraulically if the central passage 10 in the shaft is omitted and if the two enclosures A and B are interconnected by a circuit comprising, as in FIG. 3, a constriction device and an electromagnetic valve.

As a variant and in accordance with the invention, the shaft central aperture can be retained but the flow of fluid between the enclosures can be controlled by an internal valve which is biased against the springs by the electromagnetic field produced by the field device, so that fluid flow is inhibited or permitted according as the field device is or is not energized.

As an example, FIG. 4 shows this feature applied to a device such as the device shown in FIG. 1. The central portion of shaft 9 takes the form of a magnetic tube 25 secured to shaft ends 9d. Tube 25 is pierced at its end with radial passages 26, and a hollow valve 27 pierced with radial passages 26a can slide in the bore of tube 25. When the field device 12 is not energized, the valve 27 takes up in the tube 25 a central position which can be seen in FIG. 4 and which is imposed by lateral springs 28; the passages 26a are then offset from the passages 26 and there is no communication between the enclosures A and B; gaskets 22b mounted in a ring 3a prevent any flow of fluid along the air gap. When the field device 12 is energized, however, the valve 27 is biased, for instance, to the left and abuts the inside surface of the corresponding shaft end 9d, in a position in which the left-hand passages 26a and 26 register and the corresponding right-hand passages do not; fluid can then flow between the two enclosures A and B and the shaft system can be moved to the left by the electrodynamic force operative between, on the one hand, the field device 12 and, on the other hand, the tube 25 and the valve 27. When the field device 12 ceases to be energized, the shaft stops again and the valve 27 is restored to its central position by the springs 28.

In the previous examples the shaft has been immobilized by inhibiting liquid flow between two enclosures or chambers either by means of an electromagnetic valve or by means of a hollow valve member received in a central tube (FIG. 4). The blocking can also be achieved by associating, in accordance with the invention, known mechanical locking, of a kind used to immobilize conventional hydraulic jacks with the rectilinear-motion device hereinbefore described.

The embodiments described with reference to FIGS. 1 and 4 have of course been chosen to make clear the nature of the invention but they are not to be considered limitative. For instance, any rectilinear-motion device using any combination of the various means described or shown, and any improvement of similar design and pursuing the same aims, will not depart from the scope of this invention.

Similarly, the external hydraulic circuits can be amplified or modified by means of known elements normally used inter alia in jack installations, such as the addition of a manocontact or of a safety valve or of limit switches or replacement, if necessary, of the constriction device T either by a flow controller giving shaft movement in one direction at an adjustable but constant speed despite variations of the force and in the other direction a speed corresponding to the position of a built-in constriction device, or a flow regulator with constriction device and non-return valve giving a higher speed in the second direction just mentioned, or a valve device associated with two non-return valves to give different rates of flow in the two flow directions, or a pressure limiter to avoid excessive speed should the resistive force be small as compared with the driving force.

The improved device according to the invention is, with advantage, of use as an electric ram or jack instead of a hydraulic ram or jack, inter alia in cases in which the distribution of such a fluid or the installation of a compressor raises practical or economic problems.

I claim:

1. A rectilinear-motion drive device of the longitudinally moving magnetic field type including a field and an armature shaft movable therein, comprising a coaxial tubular member extending beyond at least one of the field end faces, means associated with the armature shaft and with the tubular member to bound therein two liquid-filled hermetic enclosures through which the armature shaft extends so that the volumes of said enclosures vary in inverse proportion and by the same amount for a movement of the armature shaft in either direction, a limited delivery duct interconnecting said enclosures for limiting the armature shaft speed, and means for progressively closing said duct when the armature shaft approaches its limit of travel so as to brake the armature shaft.

2. A device according to claim 1, wherein the tubular member is closed at its ends by end plates and extends beyond both the field device end faces, and wherein the armature shaft comprise a central drive part having a central passage acting as said limited delivery duct and interconnecting the two enclosures bounded laterally by the end plates and the field end faces, and two lateral parts which extend beyond the enclosures through gaskets in said end plates, the diameters of said lateral parts being the same but different from the diameter of the central drive part.

3. A rectilinear-motion drive device of the longitudinally moving magnetic field type including a field and an armature shaft movable therein, comprising a coaxial tubular member secured to the field and extending beyond both field end faces, and means associated with the armature shaft and with the tubular member to bound therein two liquid-filled hermetic enclosures through which the armature shaft extends so that the volumes of said enclosures vary in inverse proportion and by the same amount for a movement of the armature shaft in either direction, said means including pistons secured to the two ends of the armature shaft and sliding hermetically within the tubular member, the armature shaft being pierced with a central passage interconnecting the enclosures bounded laterally by the pistons and the end faces of the field, said central passage in the armature shaft limiting the speed of movement thereof.

4. A rectilinear-motion drive device of the longitudinally moving magnetic field type including a field and an armature shaft movable therein, comprising a coaxial tubular member secured to the field and extending beyond only one of the field end faces, and means associated with the armature shaft and with the tubular member to bound therein two liquid-filled hermetic enclosures through which the armature shaft extends so that the volumes of said enclosures vary in inverse proportion and by the same amount for a movement of the armature shaft in either direction, the armature shaft being centered and guided hermetically at the ends of the tubular member, said means including a piston secured thereto at a predetermined distance from said one end face of the field and movable in said tubular member so as to define said two enclosures and further comprising a limited delivery duct interconnecting said enclosures for limiting the armature shaft speed.

5. A rectilinear-motion drive device of the longitudinally moving magnetic field type including a field and an armature shaft movable therein, comprising a coaxial tubular member extending beyond both end faces of the field so as to bound therein two liquid-field hermetic enclosures through which the armature shaft extends so that the volumes of said enclosures vary in inverse proportion and by the same amount for a movement of the armature shaft in either direction, and wherein gaskets are provided to inhibit fluid flow along the air gap between the field and the armature shaft, the armature shaft having means for immobilizing it hydraulically in the absence of any electrodynamic force including: a central tube experiencing the magnetic field produced by the field; two cylindrical side shafts secured to the central tube ends, the side shafts having a different diameter from the central tube and moving hermetically through end plates disposed at the ends of the tubular member; a hollow valve moving in the central tube; and springs immobilizing the hollow valve at the center of the central tube in the absence of field; the central tube and the hollow valve having at their ends radial passages so disposed relatively to one another so as to interrupt any liquid flow between the two enclosures when the field is not energized and as to allow liquid flow, and therefore shaft movement, at a limited speed when the hollow valve is moved by the electromagnetic field in the central tube until abutting the inside end face of one of the side shafts.

* * * * *